United States Patent
Gidlund et al.

(10) Patent No.: US 9,451,498 B2
(45) Date of Patent: Sep. 20, 2016

(54) ENERGY EFFICIENT METHOD FOR COMMUNICATION IN A WIRELESS SENSOR NETWORK OF AN INDUSTRIAL CONTROL SYSTEM

(75) Inventors: Mikael Gidlund, Sundsvall (SE); Tomas Lennvall, Vasteras (SE); Jonas Neander, Vasteras (SE)

(73) Assignee: ABB Research Ltd., Zurich (CH)

( * ) Notice: Subject to any disclaimer, the term of this patent is extended or adjusted under 35 U.S.C. 154(b) by 240 days.

(21) Appl. No.: 13/618,962

(22) Filed: Sep. 14, 2012

(65) Prior Publication Data
US 2013/0064229 A1 Mar. 14, 2013

Related U.S. Application Data

(63) Continuation of application No. PCT/EP2010/053337, filed on Mar. 16, 2010.

(51) Int. Cl.
*H04W 28/06* (2009.01)
*H04W 84/18* (2009.01)

(52) U.S. Cl.
CPC .......... *H04W 28/065* (2013.01); *H04W 84/18* (2013.01); *Y02B 60/50* (2013.01)

(58) Field of Classification Search
CPC .................................................. H04W 72/04
See application file for complete search history.

(56) References Cited

U.S. PATENT DOCUMENTS

| | | | | |
|---|---|---|---|---|
| 8,644,341 B1 * | 2/2014 | Petranovich | ......... | H04L 1/0041 370/473 |
| 2006/0028997 A1 | 2/2006 | McFarland | | |
| 2009/0010205 A1 * | 1/2009 | Pratt, Jr. | ................ | G01D 21/00 370/328 |
| 2009/0060009 A1 * | 3/2009 | Qian | ................... | H04L 49/9094 375/211 |
| 2009/0122755 A1 | 5/2009 | Seok et al. | | |
| 2009/0141898 A1 * | 6/2009 | Huang | ................. | H04L 9/0833 380/270 |
| 2009/0201898 A1 | 8/2009 | Gong et al. | | |
| 2011/0019557 A1 * | 1/2011 | Hassan | ................. | H04L 47/10 370/252 |
| 2011/0145561 A1 * | 6/2011 | Anil | .................... | H04L 63/0428 713/150 |

FOREIGN PATENT DOCUMENTS

| EP | 1538806 A2 | 6/2005 |
|---|---|---|
| WO | 2008070738 A1 | 6/2008 |

OTHER PUBLICATIONS

Liu, et al.; "An Optimized Aggregators Selection Problem for Industrial Wireless Sensor Networks"; 2008 IEEE pp. 4057-4062.
Lorchat, et al.; "Energy Saving in IEEE 802.11 Communications Using Frame Aggregation"; GLOBECOM 2003; pp. 1296-1300.
(Continued)

*Primary Examiner* — Sulaiman Nooristany
(74) *Attorney, Agent, or Firm* — Whitmyer IP Group LLC

(57) ABSTRACT

A method for communication in a wireless sensor network of an industrial control system. The network includes a plurality of device nodes and at least one gateway. The method includes aggregating in at least one wireless device data originating from at least two data packets. The method includes receiving at a first node at least one first data packet for a first destination address and aggregating data from the at least one data packet with data from at least one second data packet, intended for the same first destination address, forming an aggregated data packet and sending the aggregated data packet to another node or to said gateway. In other aspects of the invention a method, system and a computer program for carrying out the method are described.

20 Claims, 4 Drawing Sheets

(56) References Cited

OTHER PUBLICATIONS

International Preliminary Report on Patentability; Application No. PCT/EP2010/053337; Issued: Aug. 6, 2012; 20 pages.
International Search Report and Written Opinion of the International Searching Authority; Application No. PCT/EP2010/053337; Issued: Oct. 11, 2010; Mailing Date: Oct. 19, 2010; 15 pages.
Prof. Riki Jantti; Presentation at 8th Scandinavian Workshop on Wireless Adhoc Networks; May 7-8, 2008; 30 pages.
Raza, et al.; "Security Considerations for the WirelessHART Protocol"; IEEE 2009; pp. 1-8.
Di Marco, et al.; "SERAN ++: A Cross-Layer Protocol for Wireless Sensor Networks in Control and Automation"; 2008; pp. 2-10.
Krishnamachari, et al.; "The Impact of Data Aggregation in Wireless Sensor Networks"; 2007; 4 pages.
Software Technologies Group, Wireless Solutions—WirelessHART Datasheet; Nov. 10, 2009; 7 pages.
Written Opinion of the International Preliminary Examining Authority; PCT/EP2010/053337; Issued: Apr. 27, 2012; 6 pages.

* cited by examiner

ENERGY EFFICIENT METHOD FOR COMMUNICATION IN A WIRELESS SENSOR NETWORK OF AN INDUSTRIAL CONTROL SYSTEM

CROSS-REFERENCE TO RELATED APPLICATIONS

The present application is a continuation of pending International patent application PCT/EP2010/053337 filed on Mar. 16, 2010 which designates the United States and the content of which is incorporated herein by reference.

FIELD OF THE INVENTION

The present invention is concerned with a method for communication from a plurality of device nodes in a wireless sensor network of an industrial control system or a process control system. In particular the invention is concerned with a method for aggregating data packets in an energy-efficient way and wireless devices arranged with hardware and software devices for carrying out the method.

BACKGROUND OF THE INVENTION

Industrial control systems, process control systems, distributed control systems and the like in process industries often comprise both hard wired data networks and wireless data networks. Process industries can include branches of industry such as pulp and paper, pharmaceuticals, food production, oil and gas extraction, production, processing and the like. Wireless sensor networks are used to communicate measurements and some control data between wireless field devices such as sensors and the industrial control system. Wireless sensors often battery powered.

Service life for a battery-powered wireless sensor depends on power use. Service life for a wireless sensor network also depends therefore on power use by individual wireless sensors. The radio receiver/transmitter of a wireless sensor typically consumes most power while sending a transmission, and power while listening for transmissions, and almost no power during an inactive state. Conventionally wireless sensors in a WSN are configured to use little or no energy during inactive periods, also called a during sleep state, conserving energy for a limited number of periods for listening for signals and/or for transmitting a signal.

There are many different wireless protocols in use in industry generally. They include proprietary protocols, open protocol and networks with more than one type of protocol operating in the same broadcast/reception area. Two examples of a wireless standard in use in industry are called ISA100 also including version ISA 100.11a, for wireless sensing in industrial automation applications, and WirelessHART. WirelessHART is a standard that was developed to be compatible with older HART standards for communication between industrial devices.

WirelessHART [1] is quite a widely used standard in industry, and is based on the wired HART Communication Protocol that has been on the market since the 1980s. WirelessHART is a standard developed for the industrial process automation and control automation. It is a simple, robust, reliable, secure, self-healing and self-organizing multi-hop wireless mesh network. The WirelessHART technology is fully compatible with the HART standard but WirelessHART has all the benefits of the wireless technology. WirelessHART uses radios compliant with IEEE 802.15.4-2006 [2]. WirelessHART is Time Division Multiple Access (TDMA) based where all the devices in the network are time synchronized. A pre-schedule with fixed time slots is used in order to reduce transmission collisions between devices. One cycle of slots are called a super frame where the devices have their send, receive, retransmission and alternative path slots.

FIG. 2 (Prior Art) shows a packet according to the WirelessHART standard which is divided into six layers. The Physical Layer 400 consists of a preamble, start flag (delimiter), and byte count, where the delimiter is used for training of a receivers radio. The Data Link Layer starts with a single byte value of 0x41 and the address specifier specifying 2 or 8 byte source and/or destination addresses. The Sequence Number and the network ID declares what network the device belongs to. If a device receives a packet from another network it will discard it. The Data Link Protocol Data Unit (DLPDU) 300 is the actual Data Link Layer packet and the DLPDU-specifier specifies: the packet priority, if the network key is used and the type of the packet. The data link layer ends with a Keyed Message Integrity Code (MIC) and a Cyclic Redundancy Check (CRC).

The Network Layer 200 starts with a control byte specifying the size of the source and destination address, either 2 or 8 bytes. The control byte also specifies if Expanded Routing Information (ERI) is used. The forwarding devices decrement the TTL (time to live, eg 10 hops) and discards the packet if it becomes 0 except when it is 0xFF then it will not be decremented and is always forwarded onward by the devices. The ASN Snippet is the last 16 bits of the ASN when the Network Layer where invoked. The Graph ID is used to route the packet to the final destination and contains a list of devices which can be used.

The Security Sub-Layer ensures a secure communication between the sender and the final destination, an end-to-end type of security. The length of the Sub-Layer depends on the type of security used. The type of security used is specified in the Security Control Byte (SCB). Session keyed uses a 1 byte nonce Counter, and Join and handheld keyed use a 4 byte nonce counter. The Security Sub-Layer also includes a 4 byte MIC for the deciphering of the Network Layer payload.

The Transport Layer 100 is enciphered and contains a transport control byte specifying the sequence number and if:

ACK should be used or not it is a response packet it is unicast or broadcast

The transport control is used to indicate communication error or command response status. The extended device status is used to indicate the status of the device. The Application Layer consists of the actual command. It includes the command number, the data length and the actual data.

Minimizing the energy consumption of a battery powered device is very important. In general, to send one packet for each sensed data value is energy inefficient in most cases. In some cases Data aggregation, aggregation of the raw data may be used. One possible solution is to aggregate data from different devices as it traverses towards the destination. EP1626532, entitled Wireless building control architecture, assigned to Siemens Building tech AG, describes building automation systems and in particular, a wireless building control architecture that implements automation of building systems in which collections or groups of sensors or actuator data are aggregated.

EP 1 538 806 A1 entitled Method of frame aggregation, assigned to Lucent Inc., describes a method for dynamically aggregating data packets for transmission of voice data to take advantage of variations in available bandwidth in a channel to transmit an increased amount of data within a restricted bandwidth.

However, data packet aggregation is not supported in all wireless protocols suitable for industrial use. For example the above described version of the WirelessHART standard does not define a data packet which is constructed to facilitate data aggregation between different devices. This means that for each item of data generated by a wireless field device in a conventional wireless network the transmitted packet will have to travel all the way from the device to the destination, regardless of the size of the data. All these transmissions consume a large amount of energy in wireless devices with a limited energy supply. In addition the requirement for security of the data being communicated means that the data is encrypted and can only be read by the sending or the receiving node, ie the data is protected by end-to-end security.

US2009201898A1 entitled End-to-end packet aggregation in mesh networks, assigned to Cisco Tech Inc., describes aggregating packets that are destined for a selected wireless client, up to a size limit, taking into account the path to the selected mesh point as well as quality of service constraints. US2009060009A1, entitled Aggregate data frame generation, and assigned to Cisco' Technology Inc., describes that an aggregate frame, such as an A-MSDU aggregate is generated from interleaved frames addressed to various receiver addresses. The incoming frames are regrouped by receiver address. The aggregate frame is generated from the regrouped frames. WO2008070738A1, entitled Enhanced management frame aggregation in a wireless network system, and assigned to Qualcomm Inc., describes methods to facilitate enhanced aggregation of management frames in a wireless communication system. It is described that management frames can be encapsulated into respective data frames, thereby allowing management frames to be aggregated with data frames. Further, indications can be provided to a receiving station to indicate the presence of an encapsulated management frame and/or encrypted management information within the aggregated frame. In an article entitled Security considerations for the WirelessHART protocol, by Shahid Raza et al, 978-1-4244-2728-4/09 published by the IEEE in 2009, security aspects of WirelessHART networks are described.

SUMMARY OF THE INVENTION

The aim of the present invention is to remedy one or more of the above mentioned problems. This and other aims are obtained by a method for communication in a wireless sensor network of an industrial control system, said network including a plurality of device nodes and a gateway, said method including aggregating data originating from at least two data packets, said data packets including an encrypted part, characterised by receiving at a first node at least one first data packet for a first destination address and aggregating data including a first said encrypted part from the at least one first data packet with data including a second encrypted part from at least one second data packet intended for the first destination address, forming an aggregated data packet including the first said encrypted part and the second encrypted part adding the size of the first said encrypted part to the Network & Security Sub-layer and sending the aggregated data packet to another node or to said gateway.

In a first aspect of the invention a method for communication in a wireless sensor network (WSN) of an industrial control system is disclosed, said network comprising a plurality of device nodes and a gateway, comprising aggregating data originating from at least two data packets, said method further comprising receiving at a first node at least one first data packet for a first destination address and aggregating data from the at least one data packet with data from at least one second data packet intended for the first destination address, forming an aggregated data packet and sending the aggregated data packet to another node or to said gateway.

In an embodiment of the invention a method for communication in a wireless sensor network (WSN) of an industrial control system is disclosed, said method comprising receiving at a first node at least one first data packet for a first destination address and aggregating data from the at least one data packet with data from at least one second data packet intended for the first destination address, forming an aggregated data packet and sending the aggregated data packet to another node or to said gateway, said method further comprising receiving at the first node the at least one first data packet for the first destination address, saving the at least one first data packet in a Packet Buffer, adding data from at least one second data packet for the first destination address to the data stored in a buffer, and sending an aggregated data packet to another device or a gateway.

In another embodiment of the invention a method for communication in a wireless sensor network (WSN) of an industrial control system is disclosed, said method comprising receiving at a first node at least one first data packet for a first destination address and aggregating data from the at least one data packet with data from at least one second data packet intended for the first destination address, forming an aggregated data packet and sending the aggregated data packet to another node or to said gateway, said method further comprising receiving at the first node the at least one first data packet for a first destination address and calculating an estimated size for the aggregated packet containing aggregated packet data from the at least one first data packet and the at least one second data packet and comparing the result with a predetermined maximum data packet size.

In another embodiment of the invention a method for communication in a wireless sensor network (WSN) of an industrial control system is disclosed, said method comprising receiving at a first node at least one first data packet for a first destination address and aggregating data from the at least one data packet with data from at least one second data packet intended for the first destination address, forming an aggregated data packet and sending the aggregated data packet to another node or to said gateway, said method further comprising receiving at the first node the first data packet and re-using at least one Enciphered block from a Transport and Application Layer of the first data packet to form the aggregated data packet.

In a preferred embodiment of the invention a method for communication in a wireless sensor network (WSN) of an industrial control system is disclosed, said method comprising receiving at a first node at least one first data packet for a first destination address and aggregating data from the at least one data packet with data from at least one second data packet intended for the first destination address, forming an aggregated data packet and sending the aggregated data packet to another node or to said gateway, said method further comprising receiving at the first node the at least one first data packet and re-using at least one Enciphered block from a Transport and Application Layer of the first data packet and adding one further byte representing the size of the at least one Enciphered block forming the aggregated data packet.

In an embodiment of the invention a method for communication in a wireless sensor network (WSN) of an industrial control system is disclosed, said method comprising receiving at a first node at least one first data packet for a first destination address and aggregating data from the at least one data packet with data from at least one second data packet intended for the first destination address, forming an aggregated data packet and sending the aggregated data packet to another node or to said gateway, said method further comprising forming the aggregated data packet from Aggregation application data originating from two or more data packets wherein the aggregated data packet comprises a Transport Layer including fields from the first data packet and fields from each successive data packet forming the aggregated data packet.

In another embodiment of the invention a method for communication in a wireless sensor network (WSN) of an industrial control system is disclosed, said method comprising receiving at a first node at least one first data packet for a first destination address and aggregating data from the at least one data packet with data from at least one second data packet intended for the first destination address, forming an aggregated data packet and sending the aggregated data packet to another node or to said gateway, said method further comprising arranging routing and slot timing of said communication such that each preceding device in a route sends before the succeeding device in the same route.

In a preferred embodiment of the invention a method for communication in a wireless sensor network (WSN) of an industrial control system is disclosed, said method comprising receiving at a first node at least one first data packet for a first destination address and aggregating data from the at least one data packet with data from at least one second data packet intended for the first destination address, forming an aggregated data packet and sending the aggregated data packet to another node or to said gateway, said method further comprising forming the aggregated data packet to include information for implementing end-to-end security. In particular this data packet aggregation method that maintains end-to-end security may be carried out by forming the information for implementing end-to-end security by adding information identifying the sender of each data packet included in part in the aggregated data packet. By this means the energy savings of data packet aggregation are achieved without any degradation of wireless network security.

Using data aggregation between devices in a conventional wireless network saves energy and thereby prolongs the lifetime of the network. For example in comparison to a network compatible with a standard such as WirelessHART, the disclosed proposed method makes it possible to save nearly 50% of energy, depending on the network topology, compared to sending a series of separate messages to the same destination address. By aggregating data, the amount of bandwidth that is needed in a frame is reduced, i.e., more devices can be supported in the network or each device can transmit a larger amount of data.

Another potential advantage by reducing the used bandwidth in an otherwise conventional wireless network is that the wireless network compatible with a standard such as WirelessHART will interfere less with other surrounding wireless networks, e.g., WLAN, ZigBee, Bluetooth, etc., and in particular networks operating in the 2.4 GHz ISM frequency band.

Wireless sensor networks may be connected permanently or temporarily to control systems for monitoring and control purposes and are widely used in a number of different industrial environments, such as for instance pulp and paper processes, oil and gas production processes and electrical power production processes. There is a continual and generally increasing requirement for information about plant equipment, current and historic process data, trends, etc to carry out supervision and control of control of processes, industrial plants and production facilities. This information is typically provided by the control system and usually in the form of one or more distributed control systems (DCS) and/or supervisory control and data acquisition (SCADA) systems. The control system relies in turn on a stable and timely flow of measurement data from sensors, actuators such as valves etc, temperature measurement, pressure measurements and so on.

Reducing the energy consumption of the wireless sensor devices enables the network to be maintained for longer periods without battery replacements. The advantages of reduced energy use are particularly great in industrial installations with hundreds or thousands of wireless sensors. Servicing wireless sensor devices normally means stopping parts of a plant for some weeks, implementing rigorous safety routines in hazardous areas and deploying skilled engineers and technicians to locate and service the various devices.

With the invention one problem of security of wireless communication of data is solved. The requirement for security of communication of data means that the data is encrypted and can only be read by the sending or the receiving node, ie end-to-end security. By using the methods described data packet aggregation is achieved despite the requirement for end-to-end security. The security requirement is solved by taking the information necessary for reading the encrypted data from an original data packet and including it in the aggregated data packet. Thus end-to-end security is maintained, and no intermediate node can look up or access the information.

In another aspect of the invention, a wireless device is disclosed which is arranged for communication to a gateway in a wireless sensor network of an industrial control system comprising a plurality of device nodes, wherein the wireless communication is arranged for aggregating data originating from at least two data packets, and wherein the wireless device comprises a circuit and a memory storage device arranged with suitable instructions to carry out a method of communication routing comprising the steps of; receiving at a first node at least one first data packet for a first destination address, and aggregating the at least one data packet with at least one second data packet intended for the first destination address, forming an aggregated data packet and sending the aggregated data packet to a gateway or another node.

A computer program, and a computer program recorded on a computer-readable medium such as a computer program product, is disclosed in another aspect of the invention.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE INVENTION

The present invention will now be described more fully hereinafter with reference to the accompanying drawings, in which certain embodiments of the invention are shown. Like numbers refer to like elements throughout the description.

Figure 1:
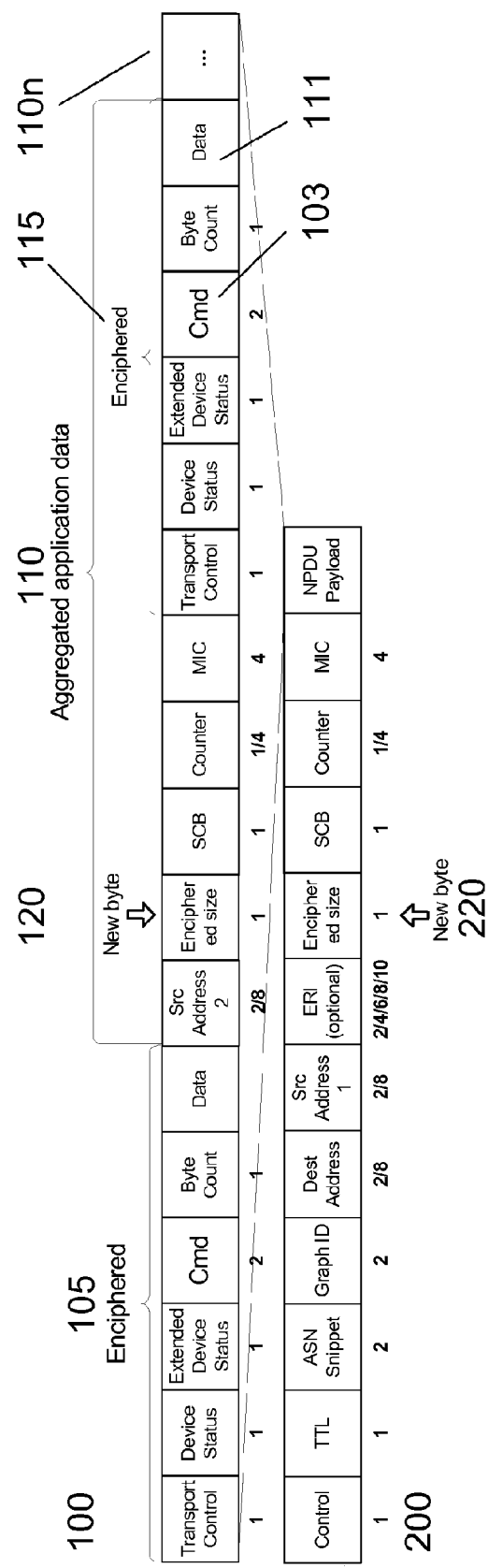
FIG. 1 shows a schematic block diagram of fields, blocks and slots of an aggregated data packet according to first aspect of the invention.

FIG. 1 shows diagram of fields, blocks and slots of an aggregated data packet according to a first aspect of the invention. The diagram shows an Aggregated Data packet comprising a Transport and Application Layer 100 and a Network & Security Sub-layer 200. The two lower layers, Physical layer 400 and Data Link layer 300 present the aggregated data packet are the same as for a standard data packet (see FIG. 2) and are not shown in FIG. 1 for the sake of clarity. The Transport and Application Layer 100 in turn comprises two functional blocks, an Encrypted block 105 and an Aggregated Application data block 110. Encrypted block 105 comprises the fields present in the WirelessHART standard data packet (see FIG. 2) namely Transport Control, Device Status, Extended Device Status, Command (CMD), Byte Count, and Data.

The Aggregated application data block 110 comprises two sub-blocks. First, from the right, is an encrypted block Enciphered 115 containing data fields including a field for Data 111, the actual measurement data or other payload, from the Transport and Application layer of a data packet that has been aggregated. The fields are substantially the same as for a WirelessHART packet (FIG. 2) and encrypted, as they were in the original packet, hence the label Enciphered. The size of this encrypted block is described in a new field 120, new byte, added into the Aggregated application data block 110. The Aggregated application data block 110 comprises, fields from the Data Link layer of a data packet that has been aggregated. These fields include a field for the Source (Src) Address, SCB, Counter, MIC).

Thus inside the Aggregated Data packet is information from the first data packet in the form of blocks 105 and 200; the data and other information from the second data packet that has been aggregated is present in the Application data 110; any successive data packets that are aggregated are added out to the right, indicated here in a block . . . (dots) with the reference number 110n.

Figure 2:
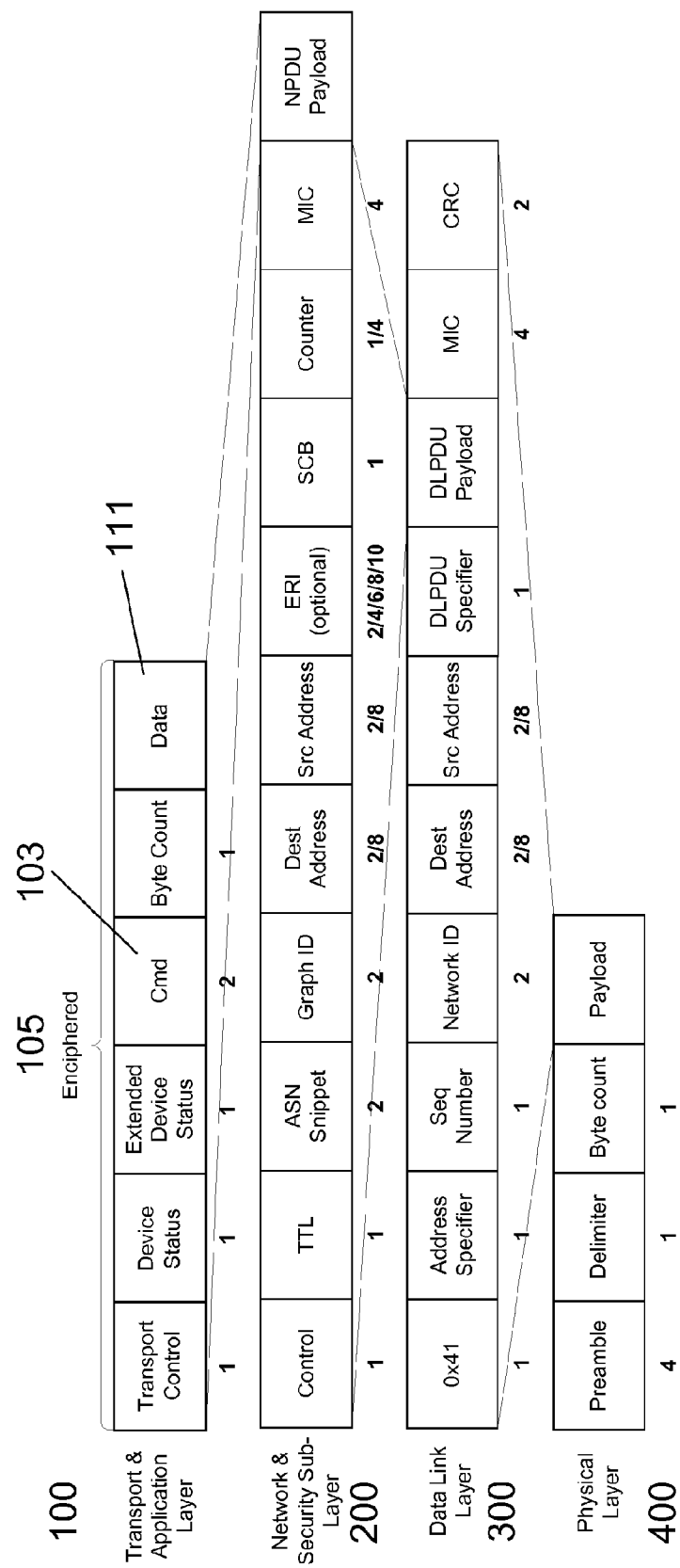
FIG. 2 (Prior Art) shows a schematic block diagram of fields, blocks and slots of a data packet according to a WirelessHART standard.

The Network & Security Sub-layer 200 is based on the Network & Security Sub-Layer of the WirelessHART packet (FIG. 2). Network & Security Sub-layer 200 differs from the standard WirelessHART packet in having an extra field, consisting of one or more bytes, shown as New byte 220 which describes the Encrypted size in a new field. The Encrypted size field of the Network & SS Layer 200 describes the size, number of bytes, of the first Encrypted block 105 of the Transport and & Application Layer.

A device can receive a plain WirelessHART packet or a packet already aggregated by another device. The receiving device will not treat the packets differently. It is important to mention that a device not capable of performing aggregation will see an incoming aggregated packet as if it was an ordinary WirelessHART packet. When a device is scheduled to send it checks its buffer to see if there exists packets with the same destination address. If the device only finds packets with different destinations it will send them as ordinary WirelessHART packets. But it will try to aggregate the packets if two or more packets with the same destination address are found. The limitations of the packet length is specified in the IEEE 802.15.4 standard (133 bytes).

When aggregating, the device will sum up the enciphered data lengths plus the 9 bytes un-enciphered fields for each packet. It will continue to do this until reaching the packet limit (minus an overhead amount (Pheader) typically equal to around 30 bytes that is needed for the physical and data link layer) or until the buffer is empty of packets to the same destination. After finding the packets to aggregate, it will start to create a new packet by copying a lot of information from the oldest packet in the buffer with the same destination address. The physical layer and data link layer fields are copied from the oldest packet and the aggregating device sets the control byte bit in the network layer. This bit informs other devices that aggregation has been used. The aggregating device will copy the rest of the control byte bits from the oldest packet in the buffer.

The graph ID and destination address are copied from the oldest packet to the new packet. The ERI fields are seldom used other for non integrated network devices and for testing or troubleshooting paths. Thus, when not used the field length is zero. After creating the packet with the fields described above the aggregating device start to include the packet specific fields. The packet specific fields are needed in order to decipher the packets at the destination. The aggregating device will, for each packet, copy the source address, create a new byte containing the length of the enciphered data followed by the SCB, counter and MIC fields and last the enciphered data, see FIG. 1. The aggregating device will not notice the difference between already aggregated packets and non aggregated packets. The aggregating device will copy the fields mention above and treat the other aggregated packets as enciphered data. The proposed aggregation algorithm can be seen in FIG. 3.

The end-to-end security requirement may be solved by taking the information necessary for reading the encrypted data from an original data packet and including it in the aggregated data packet. Thus end-to-end security is maintained, and no intermediate node can look up or access the information. The sender identity (110 Src Address 2, 200 Src Address 1 FIG. 1) is included in the encrypted part of the aggregated data packet with the payload data so that the end receiver (110, Dest Address) can look up the sender identity in a table and retrieve the correct key to decrypt the communication.

Figure 3:
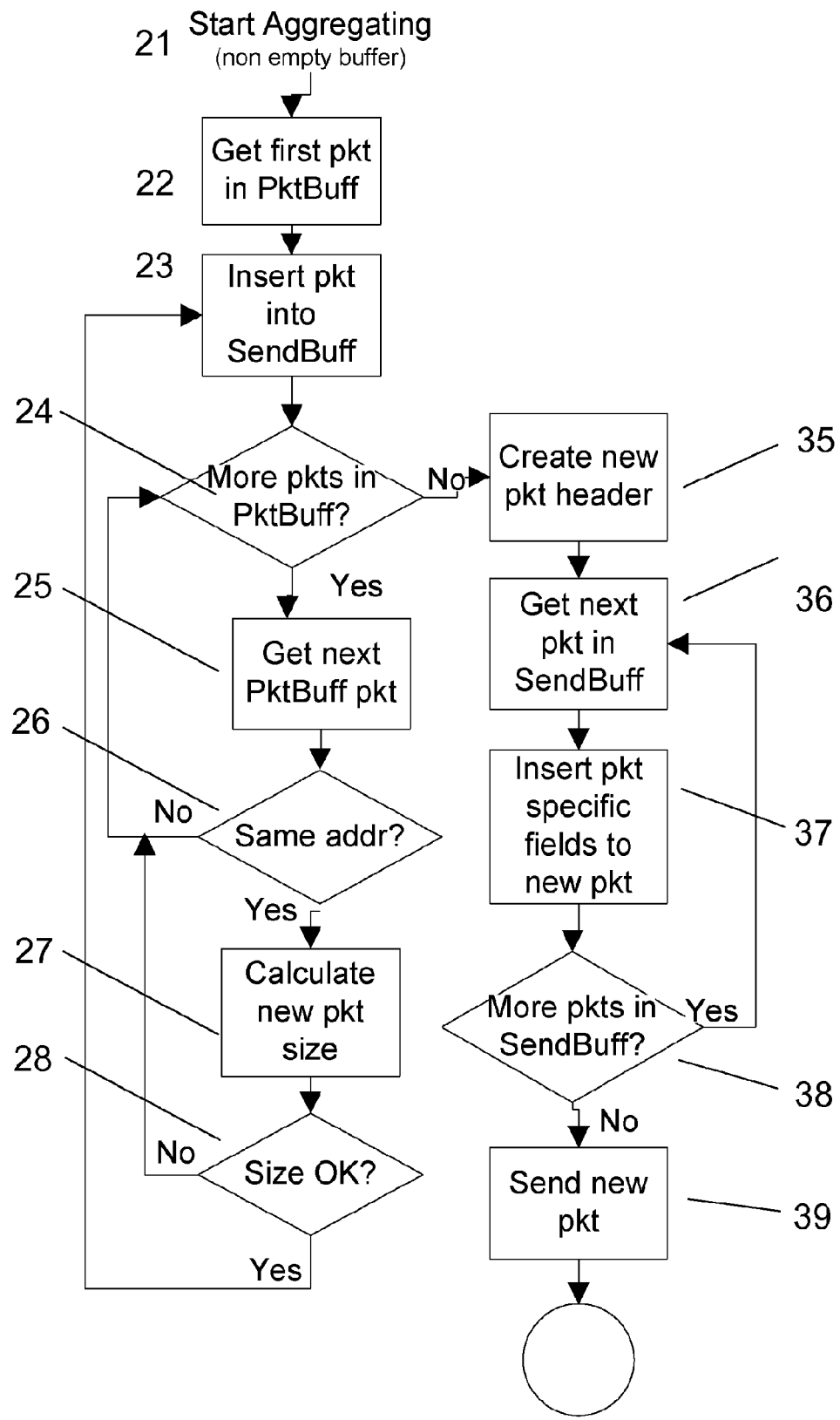
FIG. 3 (Prior Art) shows a schematic block diagram of fields, blocks and slots of a data packet according to a WirelessHART standard.
Figure 4:
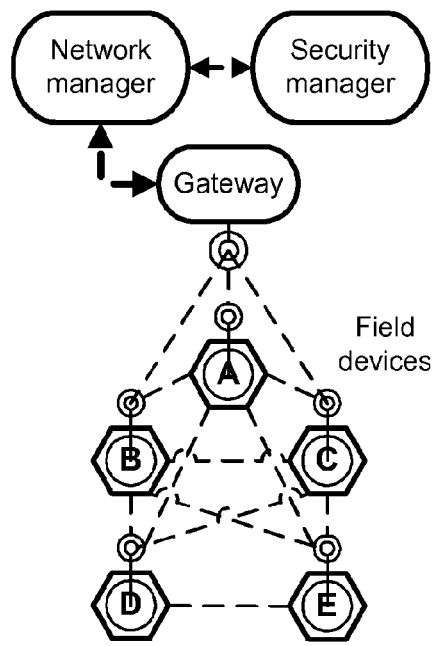
FIG. 4 (Prior Art) shows a network diagram for a simple WirelessHART network.

FIG. 3 shows a flowchart summarising steps in a method for aggregating data packets in wireless communication from a plurality of device nodes in a wireless sensor network according to a first aspect of the invention. The figure shows a process that takes place in a wireless node of a network such as in nodes A-E shown in FIGS. 4-6. In an exemplary description of an embodiment, the following steps from FIG. 3 are carried out:

21 Start aggregating (non-empty packet buffer)

22 Get first data packet in packet buffer, data packet retrieved, 23 insert packet into Send buffer, storing first data packet in a Send buffer of data packets to be sent;

24 More packets in the packet Buffer☐, check if other data packets present, if Yes
   25 Get next Packet Buffer packet, retrieve the next data packet in the packet buffer
   26 Same address?, check if that next data packet has same destination address (as first data packet), if Yes
      27 Calculate new packet size, check packet size less than maximum permitted,
      28 if size OK, less than predetermined maximum, Yes,
         25 Insert packet into Send Buffer
   If new packet size not ok, No then
      24 More packets in packet Buffer?
      24 if No, then
      35 Create new packet header, prepare for a new data packet;
      36 Get next packet in Send Buffer
      37 Insert packet specific fields in new data packet,
      38 More data packets in Send Buffer?, check if more data packets present in Send buffer, if Yes
         36 Get next packet
   If No
      39 send new packet, send the new data packet.

To summarise the process, incoming data packets are received. Two or more data packets addressed to the same destination address are aggregated in the wireless node. Data from different packets addressed to the same destination are aggregated in the node so long as there is sufficient space in the total aggregated data packet, as compared to a predetermined size value.

Thus at every wireless node an incoming data packet is scanned. It may be an ordinary data packet or it may be an aggregated data packet. There may already be a data packet that the wireless node has generated or otherwise has stored intended for transmission. The wireless node aggregates any incoming packets intended for the same destination address up until the aggregated data packet reaches a predetermined maximum packet size, after which the aggregated data packet is transmitted. One or more aggregated data packets may be aggregated into a data packet, or into another aggregated data packet in any order, so long as maximum packet size is not exceeded.

Figure 5:
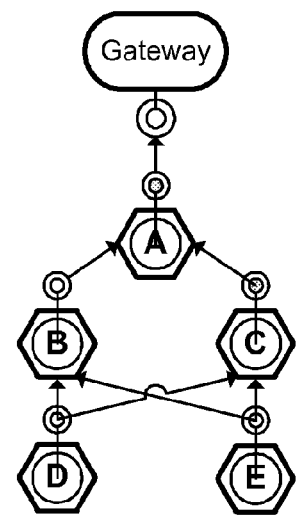
FIG. 5 shows a simple wireless network with maximum 3 hops to a gateway.
Figure 6:
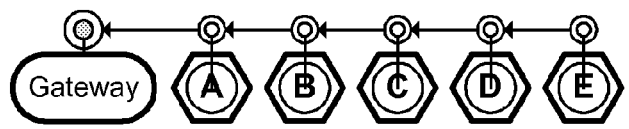
FIG. 6 shows a simple wireless network with maximum 5 hops to a gateway.

FIG. 5 shows a simple network topology with a maximum of 3 hops to the gateway GW. Suppose that device A in FIG. 5, is the only device in the network which can communicate directly with the gateway. Then, one possible routing graph extracted from this topology can be seen in FIG. 5. For example a schedule can be that devices D and E send their packets to device B. Device B send three packets (Device B's own, plus D and E's packets) to device A. Device C also sends a packet to device A, which in turn sends five packets (all the packets) to the gateway. By aggregating data packets in devices B, C and A a saving in energy used by the wireless radios of around 34% is achieved.

Processor energy consumption. With conventional processors or microprocessors the energy consumption when sending one bit equals the energy of performing up to 3000 or more MCU instructions locally in a processor. Local computations are thus energy-efficient and the extra workload devices have to perform when aggregating the data can easily be justified.

To calculate energy savings in a network using data packet aggregation, if we use for example a Texas Instruments CC2520 radio [4] in an example where we use the worst case timing behaviour of a WirelessHART slot timing. We apply this slot timing on the simple topology seen in FIG. 6 and calculate the amount of energy used to transfer one packet from each device to the gateway we get the following result. A traditional WirelessHART network uses 5.447 mJ to transfer all the packets to the gateway in this topology. When applying packet aggregation to the same topology the network uses 2.718 mJ to transfer all the packets to the gateway. Using data packet aggregation can decrease the energy usage by the wireless radio in the topology of FIG. 6 by over 50%.

The above example shows that using data aggregation between devices in a WirelessHART-compatible network saves energy and thereby prolonging the lifetime of the network.

Also by aggregating commands, the number of slots that are needed in a super frame can be reduced, or, more devices can be added to the network. By reducing the number of slots, the WirelessHART network will interfere less with the other surrounding wireless networks, e.g. WLAN, Zig-Bee, Bluetooth.

A wireless sensor network may also be connected to a node or access point or gateway of a wireless LAN, and/or may be another kind of wireless node, running any radio protocol suitable for an industrial milieu, such as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, or similar. A radio technology working in the ISM band such as in a protocol from ABB called Wireless interface for sensors and actuators (Wisa) may be used. A control system or distributed control system may also include wireless communication carried out using Infra Red (IR) means and protocols such as IrDA, IrCOMM or similar.

The methods of data packet aggregation for wireless communication in wireless sensor networks as described above, in the FIG. 3 and elsewhere in this specification may be carried out by a computer application comprising computer program elements or software code which, when loaded in a processor or computer, causes the computer or processor to carry out the method steps. The functions of processing data packets, saving data from data packets in one or more buffers, and aggregating data packets may be carried out by processing digital functions, algorithms and/ or computer programs and/or by analogue components or analogue circuits or by a combination of both digital and analogue functions. The functions may be carried out standard processors or micro processors or by hardware or configurable hardware such as a Field-Programmable Gate Array (FPGA), Complex Programmable Logic Device (CPLD) or an Application Specific Integrated Circuit (ASIC).

The methods of the invention may, as previously described, be carried out by means of one or more computer programs comprising computer program code or software portions running on a computer or a processor and stored at least in part in memory and as such accessible by the one or more processors in a wireless node such as node A-E. The or each processor may have a memory storage unit, or may be connected to a memory storage unit of another unit such as a process system control unit or a PLC (programmable Logic Controller) or other system part thereof.

The computer program comprises computer program code elements or software code portions that make the computer perform the method of data packet aggregation using algorithms and/or equations, data, stored values, predetermined values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, such as a CD (compact disc) or a DVD (digital versatile disc), hard disk, magneto-optical memory storage means, in volatile memory, in flash memory, as firmware, stored on a data server or on one or more arrays of data servers. Other known and suitable media, including removable memory media such as a USB memory stick and other removable flash memories, hard drives etc. may also be used.

[1] HART Communication Foundation. World Wide Web, http://www.hartcomm2.org/index.html, June 2009.

[2] Part 15.4: Wireless Medium Access Control (MAC) and Physical Layer (PHY) Specifications for Low-Rate Wireless Personal Area Networks (WPANs). World Wide Web, http://standards.ieee.org/getieee802/802.15.html, June 2009.

[3] Texas Instrument CC2520 DATASHEET 2.4 GHZ IEEE 802.15.4/ZIGBEE RTRANSCEIVER. RF World Wide Web, http://www.ti.com, June 2009.

[4] Texas Instrument MSP430F241x, MSP430F261x MIXED SIGNAL MICROCONTROLLER. World Wide Web, http://www.ti.com, June 2009.

It should be noted that while the above describes exemplifying embodiments of the invention, there are several variations and modifications to the methods of data packet aggregation in wireless communication here described which may be made to the disclosed solution without departing from the scope of the present invention as defined in the appended claims.

What is claimed is:

1. A method for communication in a wireless sensor network of an industrial control system, said network comprising a plurality of device nodes and a gateway, said method comprising aggregating data originating from at least two data packets, said data packets including an encrypted part, characterised by:
   receiving at a first node at least one first data packet for a first destination address;
   checking destination addresses of other data packets received at the first node for at least one second data packet intended for the first destination address;
   aggregating data comprising a first said encrypted part from the at least one first data packet with data including a second encrypted part from the at least one second data packet;
   forming an aggregated data packet comprising the first said encrypted part and the second encrypted part;
   adding one or more bytes describing a size of the first said encrypted part to a Network & Security Sub-layer;
   sending the aggregated data packet to another node or to said gateway;
   receiving at the first node at least one third data packet for a second destination address;
   checking destination addresses of other data packets received at the first node to confirm no other data packets are intended for the second destination address; and
   sending the at least one third data packet to a gateway or another node without aggregating it with another packet.

2. The method according to claim 1, characterised by receiving at the first node the at least one first data packet for the first destination address, saving the at least one first data packet in a Packet Buffer, adding data from the at least one second data packet for the first destination address to the at least one first data packet stored in Packet Buffer, and sending an aggregated data packet to another device or a gateway.

3. The method according to claim 1, characterised by receiving at the first node the at least one first data packet for a first destination address, calculating an estimated size for the aggregated packet containing aggregated packet data from the at least one first data packet and the at least one second data packet, comparing the estimated size with a predetermined maximum data packet size, and if the estimated size of the aggregated data packet is less than the predetermined maximum packet size transmitting the aggregated data packet onward from the first node.

4. The method according to claim 1, characterised by receiving at the first node the first data packet and re-using at least one Enciphered block from a Transport and Application Layer of the first data packet to form the aggregated data packet.

5. The method according to claim 1, characterised by receiving at the first node the at least one first data packet and re-using at least one Enciphered block from a Transport and Application Layer of the first data packet and adding one further byte representing a size of the at least one Enciphered block forming the aggregated data packet.

6. The method according to claim 1, characterised by forming the aggregated data packet originating from two or more wireless devices wherein the aggregated data packet comprises a Network and Security sub-layer including fields from the first data packet and from each successive data packet forming the aggregated data packet.

7. The method according to claim 1, characterised by forming the aggregated data packet to include information for implementing end-to-end security, the information comprising a source address used at the first destination address to retrieve a decryption key from a table for decrypting the aggregated data packet.

8. The method according to claim 1, characterised in that routing and slot timing of said communication method is arranged such that each preceding device in a route sends before a succeeding device in the route.

9. A wireless device arranged for wireless communication to a gateway in a wireless sensor network of an industrial control system comprising a plurality of device nodes, wherein the wireless communication is arranged for aggregating data originating from at least two data packets, said data packets including an encrypted part, characterised in that the wireless device comprises a circuit and a memory storage device arranged with suitable instructions to carry out a method of communication routing comprising the steps of:
   receiving at a first node at least one first data packet for a first destination address;
   aggregating data comprising a first said encrypted part from the at least one first data packet with data including a second encrypted part from at least one second data packet intended for the first destination address, the at least one second data packet received at the first node and different from the at least one first data packet;
   forming an aggregated data packet comprising the first said encrypted part and the second encrypted part;
   adding one or more bytes describing a size of the first said encrypted part to a Network & Security layer;
   sending the aggregated data packet to a gateway or another node;
   receiving at the first node at least one third data packet for a second destination address;

checking destination addresses of other data packets received at the first node to confirm no other data packets are intended for the second destination address; and sending the at least one third data packet to a gateway or another node without aggregating it with another packet.

10. The device according to claim 9, characterised in that the wireless device is any from the group of: wireless field device, wireless sensor, wireless instrument, wireless meter, wireless adapter of one or more field devices, hub, router, network manager device, security manager device, gateway.

11. The device according to claim 9, characterised in that the wireless device is configured to be compatible with any standard or protocol from the group of: wireless HART, ISA100.

12. The device according to claim 9, characterised in that the wireless device is powered at least in part by an energy storage unit comprising any from the group of: battery, accumulator, capacitor, condenser.

13. The device according to claim 9, characterised in that the wireless device is arranged with a processor and a memory storage device.

14. A computer program comprising software code portions or computer code to cause a computer or processor to carry out the steps of a method for communication in a wireless sensor network of an industrial control system, said network comprising a plurality of device nodes and a gateway, said method comprising aggregating data originating from at least two data packets, said data packets including an encrypted part, characterised by:

receiving at a first node at least one first data packet for a first destination address;

aggregating data comprising a first said encrypted part from the at least one first data packet with data including a second encrypted part from at least one second data packet intended for the first destination address, the at least one second data packet received at the first node and different from the at least one first data packet;

forming an aggregated data packet comprising the first said encrypted part and the second encrypted part;

adding one or more bytes describing a size of the first said encrypted part to a Network & Security Sub-layer;

sending the aggregated data packet to another node or to said gateway;

receiving at the first node at least one third data packet for a second destination address;

checking destination addresses of other data packets received at the first node to confirm no other data packets are intended for the second destination address; and sending the at least one third data packet to a gateway or another node without aggregating it with another packet.

15. A computer program product with software code portions or computer code stored on a non-transitory computer usable medium, comprising a computer readable program for causing a computer to carry out the steps of a method for communication in a wireless sensor network of an industrial control system, said network comprising a plurality of device nodes and a gateway, said method comprising aggregating data originating from at least two data packets, said data packets including an encrypted part, characterised by:

receiving at a first node at least one first data packet for a first destination address;

aggregating data comprising a first said encrypted part from the at least one first data packet with data including a second encrypted part from at least one second data packet intended for the first destination address, the at least one second data packet received at the first node and different from the at least one first data packet;

forming an aggregated data packet comprising the first said encrypted part and the second encrypted part;

adding one or more bytes describing a size of the first said encrypted part to a Network & Security Sub-layer;

sending the aggregated data packet to another node or to said gateway;

receiving at the first node at least one third data packet for a second destination address;

checking destination addresses of other data packets received at the first node to confirm no other data packets are intended for the second destination address; and sending the at least one third data packet to a gateway or another node without aggregating it with another packet.

16. A wireless sensor network system of an industrial control system comprising a plurality of wireless device nodes arranged for wireless communication to a gateway, wherein the wireless communication is arranged for aggregating data originating from at least two data packets, said data packets including an encrypted part, characterised in that two or more wireless devices comprise a circuit and a non-transitory memory storage device arranged with suitable instructions to carry out a method of communication routing comprising the steps of:

receiving at a first node at least one first data packet for a first destination address;

aggregating data comprising a first said encrypted part from the at least one first data packet with data including a second encrypted part from at least one second data packet intended for the first destination address, the at least one second data packet received at the first node and different from the at least one first data packet;

forming an aggregated data packet;

adding one or more bytes describing a size of the first said encrypted part to a Network & Security layer;

sending the aggregated data packet comprising the first said encrypted part and the second encrypted part to a gateway or another node;

receiving at the first node at least one third data packet for a second destination address;

checking destination addresses of other data packets received at the first node to confirm no other data packets are intended for the second destination address; and sending the at least one third data packet to a gateway or another node without aggregating it with another packet.

17. The system according to claim 16, characterised in that at least one wireless device of said wireless sensor network is arranged for communication with a gateway or access point.

18. The system according to claim 16, characterised in that the aggregated data packet includes information for implementing end-to-end security.

19. The method according to claim 1, characterised in that the at least one first data packet and the at least one second data packet are from different messages.

20. The method according to claim 1, characterised in that the at least one first data packet and the at least one second data packet are from different senders.

* * * * *